United States Patent
Pfeiffer et al.

(10) Patent No.: US 6,241,605 B1
(45) Date of Patent: Jun. 5, 2001

(54) DISCHARGE GEOMETRY FOR AXIALLY ARRANGED ROTARY SEPARATOR

(75) Inventors: Dohn William Pfeiffer, Davenport, IA (US); Merle Ray Gerber, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/256,109

(22) Filed: Feb. 24, 1999

(51) Int. Cl.[7] .............................. A01F 7/06; A01F 12/00
(52) U.S. Cl. ............................ 460/69; 460/80; 460/112
(58) Field of Search .................... 460/79, 80, 67, 460/98, 110, 112, 111, 121, 122, 78, 113, 119, 142, 64, 73

(56) References Cited

U.S. PATENT DOCUMENTS

| | | | |
|---|---|---|---|
| 3,186,460 | * | 6/1965 | Frederick ........................ 239/650 |
| 3,669,122 | * | 6/1972 | Rowland-Hill ................... 460/73 |
| 3,863,643 | * | 2/1975 | DePauw ........................... 460/66 |
| 4,078,571 | | 3/1978 | Todd et al. . |
| 4,149,543 | * | 4/1979 | Deconene et al. ............... 460/83 |
| 4,198,802 | * | 4/1980 | Hengen et al. ................... 56/14.6 |
| 4,254,780 | | 3/1981 | Powell et al. . |
| 4,273,138 | | 6/1981 | Pauli . |
| 4,497,327 | * | 2/1985 | Hug et al. ........................ 460/67 |
| 4,875,890 | * | 10/1989 | Margerum et al. ............... 460/68 |
| 5,021,028 | * | 6/1991 | Kersting et al. ................. 460/85 |
| 5,344,367 | * | 9/1994 | Gerber ............................. 460/68 |

FOREIGN PATENT DOCUMENTS

| | | |
|---|---|---|
| 0 124 628 | 11/1984 | (DE) . |
| 2 032 748 | 5/1980 | (GB) . |
| 1 500 194 | 8/1989 | (SU) . |
| WO 97/07660 | 3/1997 | (WO) . |

* cited by examiner

*Primary Examiner*—Thomas B. Will
*Assistant Examiner*—Meredith Petravick

(57) ABSTRACT

The discharge section of an axially arranged rotary combine is provided with a discharge chute having a ramp on the downward swept side. The ramp is provided with upper and lower metering edges for metering the flow of crop material other than grain from the helical flow to a transverse discharge beater. The floor of the discharge chute is provided with three guide vanes that define specific flow paths of the crop material being expelled by the axial crop processing unit and directing this crop material uniformly across the transverse discharge beater. The upward swept side of the discharge chute is provided with a filler plate for engaging crop material that was not engaged by the vanes to direct this crop material to the upward swept side of the discharge beater.

10 Claims, 2 Drawing Sheets

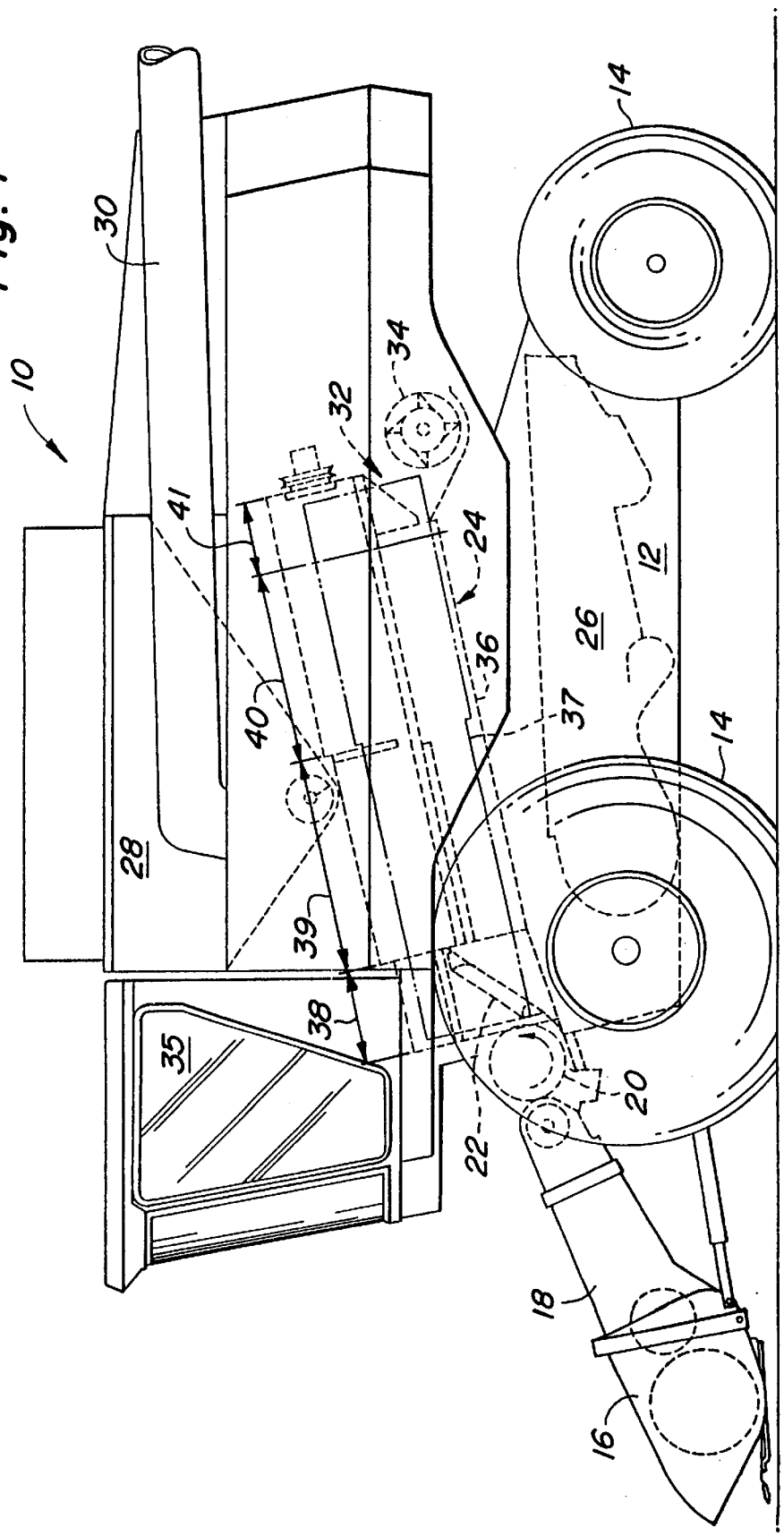

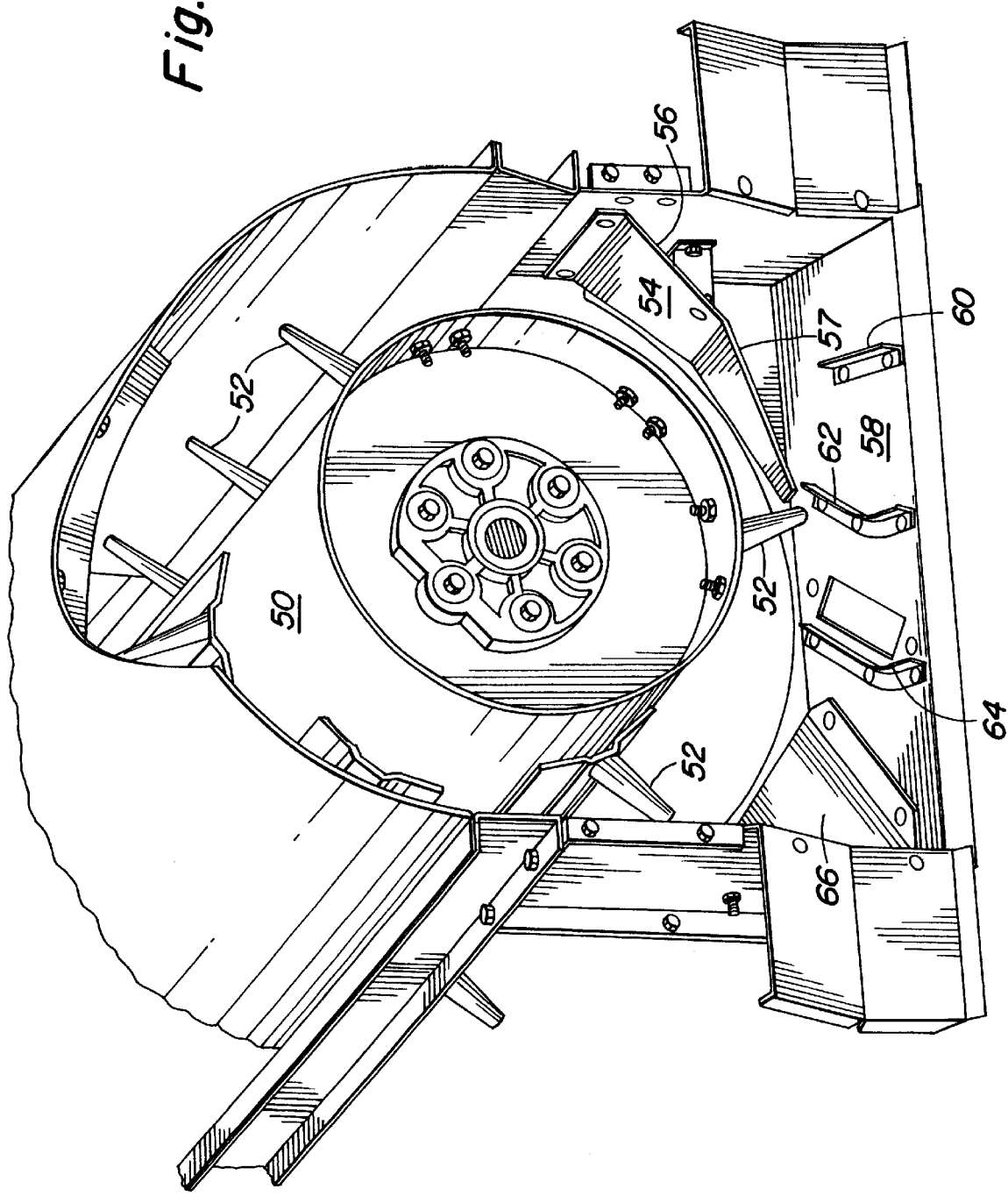

DISCHARGE GEOMETRY FOR AXIALLY ARRANGED ROTARY SEPARATOR

BACKGROUND OF THE INVENTION

1. Field of the Invention

The invention is directed to the discharge arrangement used on an axially arranged rotary separator for more uniformly distributing the discharged crop material other than grain in a transverse swath out the rear of the combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Axially arranged rotary combines have one or two large axial crop processing units located along the longitudinal axis of the machine for threshing and separating the harvested crop material. These axial crop processing units are provided with an infeed section for receiving harvested crop material, a threshing section for threshing the harvested crop material received from the infeed section and a separating section for freeing grain trapped in the threshed crop material received from the threshing section, and a discharge section for discharging crop other than grain out of the axial crop processing unit.

The harvested crop is delivered to the infeed section by the feederhouse. The crop is arranged in a crop mat which the infeed elements of the rotor need to take up and rotate into a helical flow. The helical flow of crop material moves from the infeed section to the threshing section and then to the separating section. Grain together with chaff located in the crop material is removed from the axial crop processing units by falling through grates located at the bottom of the units. Crop material other than grain, such as straw, enters the discharge section of the crop processing units from the separating section. The discharge section then expels the crop material other than grain out the rear of the combine or directs this material to a straw chopper located at the rear of the combine.

It is important to distribute the crop material other grain in a uniform transverse swath out the rear of the combine to better manage crop residue on the ground. Currently axially arranged rotary combines used specialized discharge elements on the rotor for directing the crop material to a transverse beater. It is difficult for this type of discharge arrangement to have both excellent material discharge characteristics and excellent transverse distribution in a wide variety of crops and crop conditions. Usually either the combine has excellent material discharge characteristics and marginal transverse distribution or vice versa.

SUMMARY

It is an object of the present invention to provide a discharge arrangement which has both excellent material discharge characteristics and also excellent transverse distribution characteristics in a wide range of crops and crop conditions.

To minimize the disruption of the helical flow of crop material other than grain in the discharge section, the crop engaging elements mounted to the rotor are the same in the discharge section as they are in the separating section. This makes the helical flow of crop material other than grain more uniform.

The structure of the discharge chute includes a ramp on the downward swept side of the rotor having a metering edge that meters the removal of crop material other than grain from the helical flow and directs it to the transverse discharge beater. The floor of the discharge chute is provided with three guide vanes that define specific flow paths of the crop material being expelled by the axial crop processing unit and directing this crop material uniformly across the transverse discharge beater. The upward swept side of the discharge chute is provided with a filler plate for engaging crop material that was not engaged by the vanes to direct this crop material to the upward swept side of the discharge beater.

BRIEF DESCRIPTION OF THE DRAWINGS

FIG. 1 is a side view of an axially arranged rotary agricultural combine.

FIG. 2 is a rear perspective view of the discharge section of the axial crop processing unit.

DETAILED DESCRIPTION

FIG. 1 shows an agricultural combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 can also discharge crop material other than grain directly to a straw chopper. The operation of the combine is controlled from operator's cab 35.

The axial crop processing unit comprises a cylindrical rotor housing 36 and a rotor 37 located inside the housing 36. The front part of the rotor and the rotor housing define the infeed section 38 of the crop processing unit. Longitudinally downstream from the infeed section 38 are threshing section 39, separating section 40 and discharge section 41. The rotor in the infeed section is provided with a conical rotor drum having helical infeed elements for engaging harvested crop material received from the beater 20 and inlet transition section 22. Immediately downstream from the infeed section 38 is the threshing section 39 of the crop processing unit 24. In the threshing section 39 the rotor 37 comprises a cylindrical drum having a number of threshing elements for threshing the harvested crop material received from the infeed section 38. Downstream from the threshing section 39 is the separating section 40 wherein the grain trapped in the threshed crop material is released and falls through a floor grate to the cleaning system 28. The separating section merges into a discharge section 41 where crop material other than grain is expelled from the axial crop processing unit 24.

The discharge section of the axial crop processing unit 24 is best illustrated in FIG. 2. The separating and discharge sections 40 and 41 are provided with a drum 50 having crop engaging elements 52. The drum 50 and the arrangement of the elements 52 is the same for the separating section and the discharge section to minimize disruption of the helical flow of crop material other than grain. As viewed in FIG. 2, the rotor is rotated in a clockwise direction, making the right side of the rotor housing 36 the downward swept side and the left hand side of the rotor housing the upward swept side.

The downward swept side of the discharge section is provided with a triangular ramp 54 having an upper angled edge 56 and a lower angled edge 57. The upper angled edge 56 meters the flow of crop material other than grain from the helical flow of the separator section to the discharge beater 34. Crop material other than grain falling off the upper edge 56 of the ramp stays on the right or downward swept side of the discharge section and is directed to the right transverse portion of the discharge beater 34.

The discharge section is also provided with a floor 58 having three vanes 60, 62 and 64 for controlling the flow of crop material other than grain. The first vane 60 keeps crop material other than grain falling over edge 56 on the right or downward swept side of the discharge section. Crop material other than grain falling off lower edge 57 is also metered and flows between first and second vanes 60 and 62 and is directed to the right or downward swept transverse center portion of the discharge beater 34. Crop material other than grain flowing out the bottom of the discharge section 41 flows between second and third vanes 62 and 64 and is directed to the left or upward swept transverse center portion of the discharge beater 34.

The upward swept side of the discharge section 41 is provided with a filler plate 66. The filler plate is angled to kick crop material other than grain flowing from the rotor 37 to the upward swept side of the discharge section 41 and to the left or upward swept portion of the discharge beater 34.

The ramp 54 having metering edges 56 and 57 in conjunction with the floor vanes 60, 62 and 64 and the filler plate 66 evenly distribute the flow of crop material other than grain across the transverse width of the discharge beater 34 and thereby form a more even distribution swath out the rear of the combine or to a straw chopper.

The invention should not be limited by the above described embodiments, but should be limited solely by the claims that follow:

We claim:

1. An axial crop processing unit for an axially arranged rotary agricultural combine, comprising:

a drum, having an infeed section for receiving harvested crop material, a threshing section for threshing the harvested crop material from the infeed section, and a separating section for separating grain from the threshed crop material received from the threshing section, the separating section having crop engaging elements, a discharge section merging with the separating section for discharging crop material other than grain from the axial crop processing unit, the discharge section having crop engaging elements that are the same as those used in the separating section, the drum having a direction of rotation;

the direction of rotation defining a downward swept side, and upward swept side and a bottom located between the upward swept side and the downward swept side in the discharge section, the discharge section being provided with a ramp having a metering edge for metering the flow of crop material from the downward swept side, a floor located below the ramp is provided with a first vane for keeping the crop material other than grain discharged over the metering edge on the downward swept side of the discharge section and directing the material other than grain to a transverse discharge beater.

2. An axial crop processing unit as defined by claim 1 wherein the ramp is triangular and has an upper metering edge and a lower metering edge.

3. An axial crop processing unit as defined by claim 2 wherein the floor is provided with a second vane, wherein the first vane directs crop material other than grain flowing over the upper edge to the transverse discharge beater and the second vane directs crop material other than grain flowing over the lower edge to the transverse discharge beater.

4. An axial crop processing unit as defined by claim 3 wherein the discharge section is provided with a filler plate on the upward swept side for kicking crop material other than grain to the upward swept side of the discharge section and to the transverse discharge beater.

5. An axial crop processing unit as defined by claim 1 wherein the floor is provided with a third vane located between the second vane and the filler plate for directing crop material other than grain flowing out the bottom of the discharge section and directed it to the transverse discharge beater.

6. An axial crop processing unit as defined by claim 1 wherein the discharge section is provided with a filler plate on the upward swept side for kicking crop material other than grain to the upward swept side of the discharge section and to the transverse discharge beater.

7. An axially arranged rotary combine for harvesting, threshing and separating an agricultural crop, said combine comprising;

a supporting structure;

ground engaging means extending from the supporting structure for transporting the supporting structure across a field;

an axial rotor housing located inside the supporting structure, the rotor housing is provided with an infeed section for introducing crop into the housing, a thresh ing section for threshing grain from harvested crop material and a separating section for separating grain from the threshed crop material, and a discharge section for discharging crop material other than grain from the axial rotor housing;

an axial rotor located in the rotor housing having an infeed section, a threshing section, a separating section and a discharge section corresponding to the infeed, threshing, separating and discharge sections of the axial rotor housing, the rotor has a direction of rotation defining a downward swept side and an upward swept side, the discharge section is provided with a discharge chute located below the rotor, the chute being provided with a ramp on the downward swept side for directing crop material other than grain to a transverse discharge beater, the ramp being provided with a metering edge; and said ramp extending to an area below the axial rotor.

8. An axially arranged rotary combine as defined by claim 7 wherein the discharge chute is provided with a floor having guide vanes for directing the crop material other than grain to the transverse discharge beater.

9. An axially arranged rotary combine as defined by claim 8 wherein the ramp is triangular and provided with upper and lower metering edges.

10. An axially arranged rotary combine as defined by claim 9 wherein the floor is provided with three guide vanes.

* * * * *